United States Patent

Spurgeon

[11] Patent Number: 5,852,848
[45] Date of Patent: Dec. 29, 1998

[54] FAUCET HANDLE

[75] Inventor: Gordon L. Spurgeon, Conway, S.C.

[73] Assignee: Wolverine Brass, Inc., Conway, S.C.

[21] Appl. No.: 937,167

[22] Filed: Sep. 25, 1997

[51] Int. Cl.$^6$ ............................................. F16K 31/60
[52] U.S. Cl. .................. 16/114 R; 137/315; 16/DIG. 41; 74/548; 251/292; 4/676
[58] Field of Search ................ 16/114 R, 110 R, 16/121, 118, DIG. 30, DIG. 24, DIG. 41; 137/625.4, 625.41, 315; 4/675, 676, 677, 678; 251/231, 235, 291, 292, 293; 74/523, 543, 544, 548; 200/332.1, 332.2, 335, 332; 411/393

[56] References Cited

U.S. PATENT DOCUMENTS

| | | |
|---|---|---|
| D. 382,942 | 8/1997 | Spurgeon et al. . |
| 2,416,581 | 2/1947 | Harr . |
| 4,349,940 | 9/1982 | Fleischmann et al. . |
| 4,552,171 | 11/1985 | Farrell et al. . |
| 4,829,632 | 5/1989 | Freier et al. ........................ 16/114 R |
| 5,014,749 | 5/1991 | Humpert et al. . |
| 5,031,657 | 7/1991 | Stairs . |
| 5,634,220 | 6/1997 | Chiu . |
| 5,797,422 | 8/1998 | Tokarz .................................. 137/315 |

Primary Examiner—Henry J. Recla
Assistant Examiner—Dana Richard
Attorney, Agent, or Firm—Dennison, Meserole, Pollack & Scheiner

[57] ABSTRACT

A faucet handle base includes a socket receiving the head of a valve stem, and a laterally directed elongate bore communicating with the socket. The inner end portion of the bore is internally threaded and receives a retaining screw extensible into the valve socket, the outer end portion of the bore, of a relatively larger internally threaded diameter, receives the mounting nipple on a handle insert, closing the bore and completely concealing the retaining screw.

11 Claims, 2 Drawing Sheets

FAUCET HANDLE

BACKGROUND OF THE INVENTION

In the construction of faucet handle assemblies, particularly those wherein a decorative appearance is desired, a problem arises in providing retaining screws and like connectors which are only minimally exposed or in fact not exposed at all.

Heretofore, in order to achieve such results, faucet handle construction has been rather elaborate, requiring multiple components and rather awkward assembly methods to, as an example, merely secure the handle assembly to the valve control stem. This in turn results in expenses which must be l ultimately borne by the purchaser.

SUMMARY OF THE INVENTION

The present invention is broadly concerned with faucet handle assemblies, and more particularly with a handle assembly having concealed retention means, both for the joinder of the handle base to the valve control stem and for the joinder of the handle insert to the handle base. In achieving this goal, it is an important object of the invention to do so in an economically feasible manner both with regard to the manufactured components themselves and the manner of assembly. This has been achieved in the present invention in a unique manner.

More particularly, the faucet handle includes a one-piece handle base which has a single, elongate, selectively threaded bore therethrough communicating, at the inner end, with a valve stem socket receiving the head of the valve stem. The single bore, at the inner end portion thereof, receives a threaded set screw which engages and secures the valve stem head. The bore, at the threaded outer portion thereof, receives an externally threaded nipple integral with the mounting end of a handle insert. The mounted handle insert closes the bore and completely conceals both the retaining set screw and the mounting means for the handle insert itself.

Other features and advantages of the invention will become apparent from the more detailed description following hereinafter.

DESCRIPTION OF PREFERRED EMBODIMENT

Figure 1:
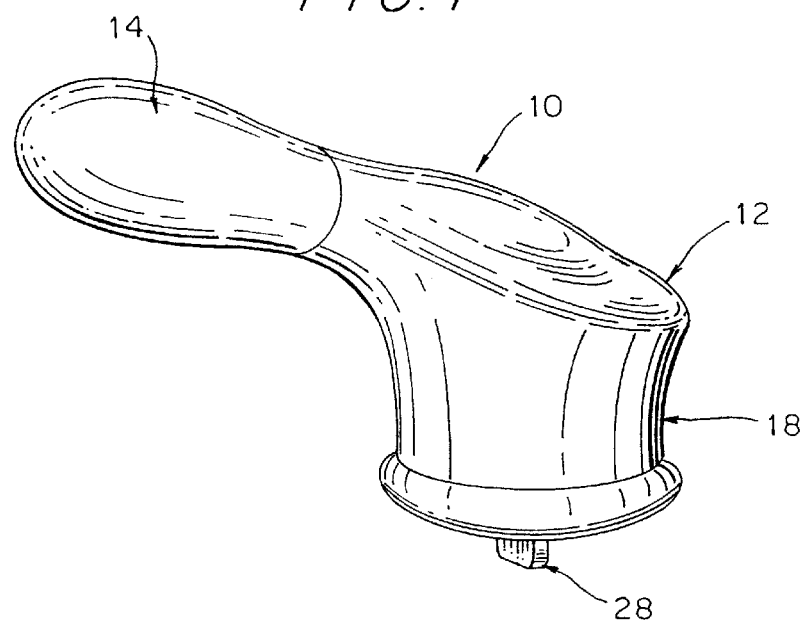
FIG. 1 is a perspective view of the assembled faucet handle of the invention.

Referring now more specifically to the drawings, it will be seen that the faucet handle 10 includes only three components, the handle base 12, the handle insert 14 and the retaining screw 16.

The handle base 12 includes a skirt section 18 with a downwardly opening internal chamber 20 having an inner end wall 22 with a socket 24 centrally therein. This socket 24 receives the head 26 of a valve control stem 28, the chamber 20 about the valve stem receiving a cap nut and such selected other components required in a conventional valve assembly (not illustrated).

Figure 2:
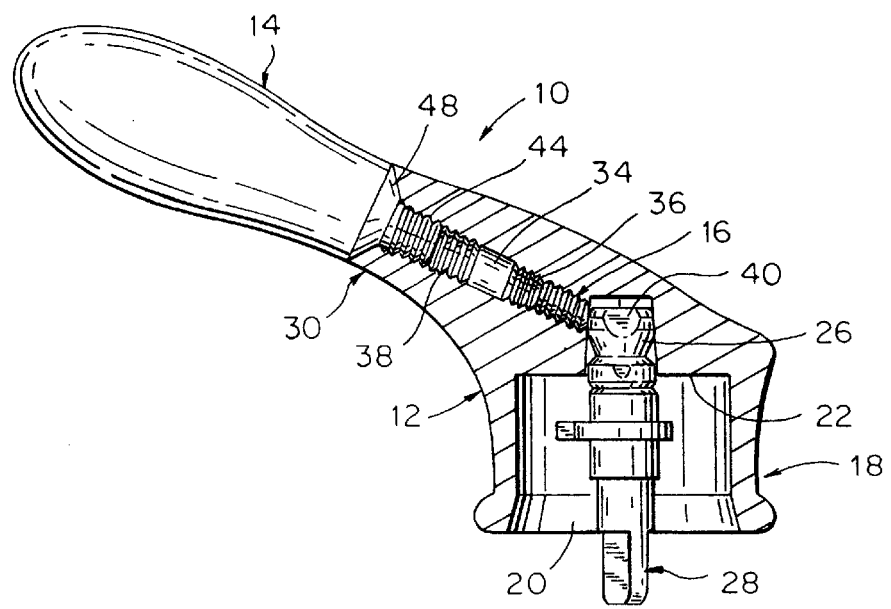
FIG. 2 is an elevational view of the assembled faucet handle with the handle base in cross-section.
Figure 3:
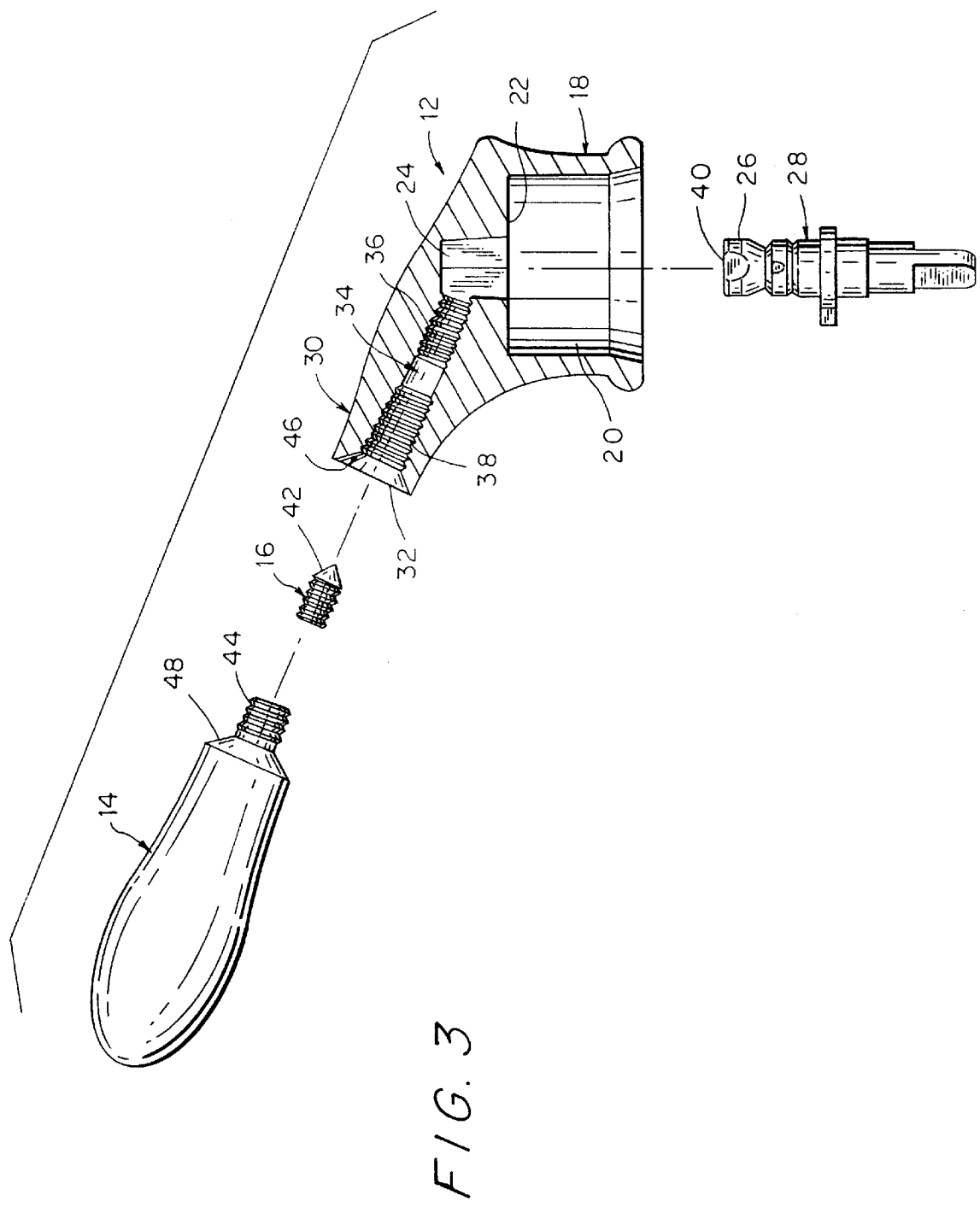
FIG. 3 is an exploded view of the handle base in cross-section, the retaining set screw, the handle insert and the valve control stem.

The handle base 12 further includes, integral with the skirt portion 18, an upwardly angled extension section 30, preferably externally configured, toward the outer end 32 thereof, to define a smooth continuation of the external configuration of the handle insert 14 as will be best seen in FIGS. 1 and 2.

The handle base 12 is completed by an elongate linear bore 34 defined through the handle base extension section 30 between an opening through the outer end 32 of the extension and the socket 24. The bore 34 is preferably of varying diameter from an internally threaded inner end portion 36 of lesser diameter to a similar internally threaded outer end portion 38 of greater diameter.

The retaining set screw 16, manipulable by a conventional hex wrench, is freely received through the outer end portion 38 of the bore and threadedly engages within the threaded inner end portion 36 of the bore for selective projection into the valve stem socket 24 and into retaining and locking engagement with the valve stem head 26, preferably against a flat 40 defined thereon. The set screw 16, in order to achieve a positive retaining engagement with the valve stem head 26, will preferably have a conical leading end 42 thereon. The trailing end of set screw 16 will have an appropriate hex socket (not shown) therein for manipulation of the set screw.

The handle insert 14 includes an integral externally threaded nipple 44 on the mounting end thereof which, after a placing of the set screw 16, is threadedly mounted within the larger internally threaded outer end portion 38 of the bore 34. Preferably the outer end of the bore 34 at the end 32 of the handle base extension 30 defines an outwardly flaring mouth 46 which conforms to and receives, in a nested manner, a similarly configured conical leading surface 48 on the end of the handle insert 14 immediately inward of the leading mounting nipple 44. Thus, when mounted as illustrated in FIGS. 1 and 2, the handle insert 14 forms a smooth continuation of the handle base extension 30 with both the valve stem mounting means and the handle mounting means completely concealed while at the same time readily accessible by merely an unscrewing of the handle insert 14.

From the foregoing, it will be appreciated that the retaining screw for a securing of the faucet handle to the valve control stem is completely concealed, as is the mounting portion of the handle insert itself. This is uniquely achieved by utilizing a single bore, the inner end of which communicates with the valve socket receiving the valve head. The inner portion of the bore is of a reduced diameter relative to the remainder of the bore for the reception of the retaining screw, the retaining screw passing freely through the outer portion of the bore to expedite the mounting thereof. The mounting nipple 44 on the handle insert 14 in turn threadedly mounts within the large outer portion 38 of the bore 34 to lock the handle insert 14 to the handle base 12 with the retaining screw 16 completely hidden. The use of a single bore 34 for the accommodation of both the valve stem retaining screw and the handle insert mounting nipple is structurally and functionally unique, providing practical advantages in the ease of assembly and disassembly, an appearance uninterrupted by attachment means, and economic advantages in materials and manufacturing procedures.

While a single embodiment of faucet handle has been illustrated, it is to be appreciated that all embodiments incorporating the novel features of the invention, as set forth in the following claims, are to be considered within the scope of the invention.

I claim:

1. A faucet handle assembly comprising a handle base, a socket defined in said handle base for the selective reception of a valve control stem, a bore through said handle base communicating with said socket, said bore having an inner end portion adjacent said socket and an outer end portion opening exteriorly of said base, a retainer receivable within said bore inner end portion, first mounting means for threadedly mounting said retainer within said inner end portion of said bore for selective extension into said socket for engaging with and retention of the valve control stem received in said socket, a handle insert, said insert having a mounting portion receivable within said outer end portion of said bore, and second mounting means for retaining said handle insert mounting portion within said bore.

2. The faucet handle assembly of claim 1 wherein said bore is of a predetermined diameter at said inner end portion and of a larger diameter at said outer end portion, said retainer being of an external diameter freely receivable through the larger diameter outer end portion of said bore and engagable within said inner end portion of said bore.

3. The faucet handle assembly of claim 2 wherein said retainer comprises an externally threaded set screw, said first mounting means comprising internal threads in said inner end portion of said bore engagable with said externally threaded set screw.

4. The faucet handle assembly of claim 3 wherein said second mounting means comprises external threads on said mounting portion of said handle insert, and internal threads in said outer end portion of said bore.

5. The faucet handle assembly of claim 4 wherein said bore extends laterally from said socket.

6. The faucet handle assembly of claim 5 wherein said bore is linear.

7. The faucet handle assembly of claim 6 wherein said threaded outer end portion of said bore has a flared outer mouth, said handle insert, immediately adjacent said handle insert mounting portion, being configured to conform to and nest within said flared mouth of said outer end portion of said bore.

8. The faucet handle assembly of claim 1 wherein said retainer comprises an externally threaded set screw, said first mounting means comprising internal threads in said inner end portion of said bore engagable with said externally threaded set screw, and wherein said second mounting means comprises external threads on said mounting portion of said handle insert, and internal threads in said outer end portion of said bore.

9. The faucet handle assembly of claim 8 wherein said threaded outer end portion of said bore has a flared outer mouth, said handle insert, immediately adjacent said handle insert mounting portion, being configured to conform to and nest within said flared mouth of said outer end portion.

10. The faucet handle assembly of claim 1 wherein said outer end portion of said bore has a flared outer mouth, said handle insert, immediately adjacent said handle insert mounting portion, being configured to conform to and nest within said flared mouth of said outer end portion, said handle insert concealing said bore.

11. A faucet handle assembly comprising a handle base, a socket defined in said handle base for the selective reception of a valve control stem, a linear bore through said handle base communicating with said socket, said bore having a threaded inner end portion adjacent said socket and an outer end portion opening exteriorly of said base, a retainer threadedly mountable within said bore at said inner end portion for selective extension into said socket for engaging with and retention of a valve stem received in said socket, and a handle insert, said insert having a mounting portion receivable within said outer end portion of said bore, and second mounting means for retaining said handle insert mounting portion within said bore.

\* \* \* \* \*